US011162311B2

(12) United States Patent
Collins et al.

(10) Patent No.: US 11,162,311 B2
(45) Date of Patent: *Nov. 2, 2021

(54) METHOD OF CONTROLLING SALINITY OF AN INJECTION WATER DURING COMMISSIONING OF AN INJECTION WELL

(71) Applicant: BP Exploration Operating Company Limited, Middlesex (GB)

(72) Inventors: Ian Ralph Collins, Middlesex (GB); John William Couves, Bourne End (GB); John Henry Crouch, Odell (GB); John Dale Williams, Beaconsfield (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 18 days.

This patent is subject to a terminal disclaimer.

(21) Appl. No.: 16/637,285

(22) PCT Filed: Aug. 9, 2018

(86) PCT No.: PCT/EP2018/071677
§ 371 (c)(1),
(2) Date: Feb. 7, 2020

(87) PCT Pub. No.: WO2019/030343
PCT Pub. Date: Feb. 14, 2019

(65) Prior Publication Data
US 2020/0248514 A1    Aug. 6, 2020

(30) Foreign Application Priority Data
Aug. 10, 2017    (GB) ..................... 1712847

(51) Int. Cl.
*E21B 21/06* (2006.01)
*E21B 43/20* (2006.01)
(Continued)

(52) U.S. Cl.
CPC ............ *E21B 21/062* (2013.01); *B01D 61/12* (2013.01); *B01D 61/58* (2013.01); *C02F 1/441* (2013.01);
(Continued)

(58) Field of Classification Search
CPC ...... E21B 21/062; E21B 43/20; E21B 49/008; E21B 21/06; E21B 21/063; E21B 21/08;
(Continued)

(56) References Cited

U.S. PATENT DOCUMENTS

| 3,208,528 A | 9/1965 | Elliott et al. |
| 4,508,169 A * | 4/1985 | Mut .................. E21B 49/087 |
| | | 166/250.01 |

(Continued)

FOREIGN PATENT DOCUMENTS

| WO | 2007/138327 A1 | 12/2007 |
| WO | 2013012548 A1 | 1/2013 |
| WO | 2017013027 A1 | 1/2017 |

OTHER PUBLICATIONS

PCT/EP2018/071677 International Search Report and Written Opinion dated Oct. 15, 2018 (11 p.).
GB1712847.1 Search Report dated Nov. 30, 2017 (501012) (3 p.).

*Primary Examiner* — Joseph W Drodge
(74) *Attorney, Agent, or Firm* — Conley Rose, P.C.

(57) ABSTRACT

An integrated system includes
a desalination plant including a reverse osmosis (RO) array to produce an RO permeate blending stream and a nanofiltration (NF) array to produce an NF permeate blending stream.

(Continued)

The integrated system also includes a blending system.
- a control unit, and
- an injection system for an injection well that penetrates an oil-bearing layer of a reservoir.

The blending system is to blend the RO permeate blending stream and the NF permeate blending stream to produce a blended injection water stream.

The control unit is to dynamically alter operation of the blending system to adjust amounts of at least one of the RO permeate blending stream and the NF permeate blending stream to alter the composition of the blended injection water stream from an initial composition to a target composition.

34 Claims, 1 Drawing Sheet

(51) Int. Cl.
- *E21B 49/00* (2006.01)
- *C02F 1/44* (2006.01)
- *B01D 61/12* (2006.01)
- *B01D 61/58* (2006.01)
- *B01D 61/02* (2006.01)
- *C09K 8/02* (2006.01)
- *C02F 103/08* (2006.01)

(52) U.S. Cl.
CPC ............. *C02F 1/442* (2013.01); *E21B 43/20* (2013.01); *E21B 49/008* (2013.01); *B01D 61/022* (2013.01); *B01D 2311/06* (2013.01); *C02F 2103/08* (2013.01); *C02F 2209/005* (2013.01); *C02F 2209/03* (2013.01); *C02F 2209/05* (2013.01); *C09K 8/02* (2013.01); *Y02A 20/131* (2018.01)

(58) Field of Classification Search
CPC ....... E21B 21/10; B01D 61/022; B01D 61/58; B01D 61/12; B01D 2311/06; B01D 61/025; B01D 61/027; B01D 61/04; B01D 61/08; B01D 61/10; B01D 2201/54; B01D 2201/56; B01D 2311/12; B01D 2311/14; B01D 2311/16; B01D 2311/246; B01D 2317/02; B01D 2317/025; B01D 2317/027; B01D 2317/04; B01D 2319/02; B01D 2319/025; B01D 2319/027; B01D 2319/04; Y02A 20/131; C02F 2103/08; C02F 1/441; C02F 1/442; C02F 2209/05; C02F 2209/005; C02F 2209/03; C02F 1/008; C02F 1/44; C02F 2209/40; C09K 8/02

See application file for complete search history.

(56) References Cited

U.S. PATENT DOCUMENTS

| | | | |
|---|---|---|---|
| 2007/0038375 A1* | 2/2007 | Jalali | E21B 47/06 702/6 |
| 2009/0194272 A1* | 8/2009 | Baillie | C02F 1/44 166/90.1 |
| 2011/0062079 A1* | 3/2011 | Daines-Martinez | B01D 61/022 210/601 |
| 2011/0108271 A1* | 5/2011 | Hinkel | E21B 43/25 166/270.1 |
| 2012/0067820 A1* | 3/2012 | Henthorne | B01D 61/08 210/641 |
| 2012/0261340 A1* | 10/2012 | Williams | B01D 61/12 210/641 |
| 2013/0161256 A1* | 6/2013 | Henthorne | B01D 63/12 210/641 |
| 2013/0213892 A1* | 8/2013 | Henthorne | B01D 61/025 210/650 |
| 2014/0311980 A1* | 10/2014 | Weston | C02F 1/442 210/652 |
| 2015/0083656 A1 | 3/2015 | Williams | |
| 2015/0371160 A1* | 12/2015 | Weatherhead | G06Q 10/0631 705/7.12 |
| 2015/0376033 A1* | 12/2015 | Tao | B01D 61/58 210/639 |
| 2016/0040522 A1* | 2/2016 | Jacob | E21B 43/20 166/267 |
| 2016/0304375 A1* | 10/2016 | Terui | B03C 1/30 |
| 2017/0173533 A1* | 6/2017 | Wang | C02F 1/008 |
| 2018/0148633 A1* | 5/2018 | Ayirala | C02F 1/08 |

* cited by examiner

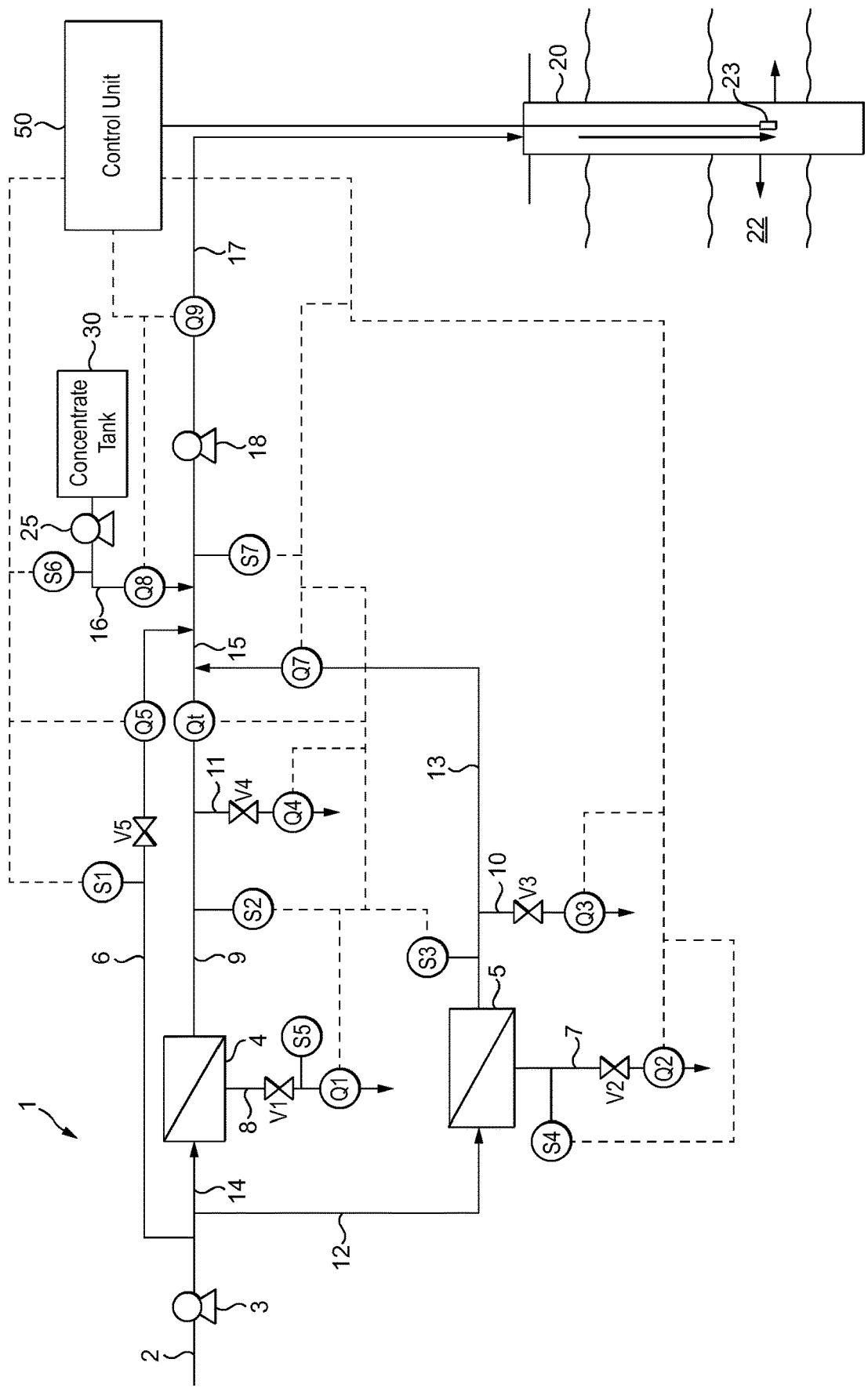

METHOD OF CONTROLLING SALINITY OF AN INJECTION WATER DURING COMMISSIONING OF AN INJECTION WELL

CROSS-REFERENCE TO RELATED APPLICATIONS

This application is a 35 U.S.C. § 371 national stage application of PCT/EP2018/071677 filed Aug. 9, 2018, entitled "Method of Controlling Salinity of an Injection Water During Commissioning of an Injection Well," which claims priority to GB Application No. 1712847.1 filed Aug. 10, 2017, and entitled "Method of Controlling Salinity of an Injection Water During Commissioning of an injection Well," each of which is hereby incorporated herein by reference in its entirety for all purposes.

STATEMENT REGARDING FEDERALLY SPONSORED RESEARCH OR DEVELOPMENT

Not applicable.

BACKGROUND

In sandstone reservoirs, depending on the content and composition of clays in the formation rock, injection of a low salinity water may result in loss of injectivity. This loss of injectivity arises from formation damage in the near wellbore region of the injection well caused by swelling of clays and migration of fines.

U.S. Pat. No. 3,208,528 teaches the phenomenon of loss of permeability ("clay blocking") when clays or other mineral fines become dispersed by fresh water, and the dispersed particles bridge to partially dam interstices in the rock. It was found that treating a water-sensitive formation by varying the salinity of the injection water such that the salt content in the injected water is reduced gradually or in step-wise fashion while maintaining constant the ratio of total salt concentration to divalent cation salt concentration until the salt concentration in the water being injected has reached the desired degree of dilution mitigates the risk of formation damage. Thus, this stepped or gradual reduction in salinity mitigates the risk of "salinity shock" and of permeability damage leading to a loss of injectivity.

BRIEF DESCRIPTION OF THE DRAWINGS

For a detailed description of the preferred embodiments of the invention, reference will now be made to the accompanying drawings in which:

FIG. 1 is a schematic view of an embodiment of an integrated, system for producing a blended injection water of variable composition for use as an injection water during commissioning of a low salinity water injection well.

DEFINITIONS

Throughout the following description the following terms are referred to:

"High salinity feed water" is the water fed to a desalination plant and is typically seawater (SW), estuarine water, aquifer water or mixtures thereof. Typically, the high salinity feed water has a total dissolved solids content in the range of from 17,500 ppmv to 50,000 ppmv.

The unit "ppmv" is "parts per million on a volume of water basis" and is equivalent to the unit "mg/L".

A "reverse osmosis (RO) filtration unit" comprises a pressure vessel, alternatively called a housing, containing one or more RO membrane elements, preferably, between 1 and 8 RO membrane elements, in particular, between 4 and 8 RO membrane elements.

A "nanofiltration (NF) filtration unit" comprises a pressure vessel containing one or more NF elements, preferably between 1 and 8 membrane elements, in particular, between 4 and 8 NF membrane elements.

A "reverse osmosis (RO) stage of a desalination plant" is a group of RO filtration units connected together in parallel. Similarly, a "nanotiltration (NF) stage of a desalination plant" is a group of NF filtration units connected together in parallel.

A "membrane block" comprises stages of RO and NF filtration connected together to provide concentrate staging and typically shares common valving and piping. A single membrane block or a plurality of membrane blocks may be mounted on a skid, "Main phase of a low salinity waterflood" refers to a phase of the low salinity waterflood following commissioning of a low salinity injection well.

"Commissioning of a low salinity injection well" refers to a period of up to several days during which the salinity of the injection water may be gradually reduced or there may be stepped reductions in salinity until the composition of the injection well reaches a target composition for the main phase of the low salinity waterflood.

An "injection system" comprises an injection line and one or more injection pumps for pumping injection water through an injection well and injecting the injection water into the formation.

An "injection site" is the site of the injection system and may be onshore or offshore (e.g., on a platform or Floating Storage and Offloading (FPSO) vessel).

"Injectivity" means the relative ease in which a fluid (e.g., an injection water) is injected into an oil-hearing layer of a reservoir.

A "blending system" comprises a plurality of feed lines for feeding blending streams leading to at least one blending point(s) and a discharge line for discharging a blended injection water stream from the blending point(s).

"TDS concentration" is the total concentration of dissolved solids and typically has units of ppmv (mg/L). In the case of an aqueous stream in embodiments described herein, the dissolved solids are ions such that the TDS concentration is a measure of the salinity of the aqueous stream.

Sodium Adsorption Ratio (SAR) is used to assess the state of flocculation or of dispersion of clays in the reservoir rock. Typically, sodium cations facilitate dispersion of clay particles while calcium and magnesium cations promote their flocculation. A formula for calculating the Sodium Adsorption Ratio (SAR) is:

$$SAR = \frac{[Na^+]}{\sqrt{(0.5[Ca^{2+}] + [Mg^{2+}])}}$$

wherein sodium, calcium, and magnesium cation concentrations of the blended injection water are expressed in milliequivalents/litre.

DETAILED DESCRIPTION

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness, In the following discussion and in the claims, the terms "including" and "comprising" are used in an open-ended fashion, and thus should be interpreted to mean "including, but not limited to."

Embodiments described herein are directed to methods and integrated systems for gradually reducing the salinity of an injection water during commissioning of an injection well to an optimal value for the main phase of a low salinity waterflood.

An integrated system comprising a desalination plant, a blending system, and control system for producing an injection water for a low salinity waterflood may be configured to allow adjustments in the ratio at which reverse osmosis (RO) permeate (produced by an RO array of the desalination plant) is blended with nanofiltration (NF) permeate (produced by an NF array of the desalination plant), which can be referred to herein as a "blend ratio", during commissioning of a low salinity injection well. Thus, in order to avoid "salinity shock", there may be either a gradual or stepped decrease in salinity of the injection water from an initial value at which there is negligible risk of formation damage to a target value for the main phase of the low salinity waterflood at which there would otherwise be a potential for formation damage. This decrease in salinity may be achieved by a gradual or step-wise increase in the blending ratio of RO permeate to NF permeate. Once the target total dissolved solids (TDS) concentration for the main phase of the low salinity waterflood is reached, the blending ratio may be kept constant or substantially constant. By the blending ratio being kept "substantially constant" is meant the blending ratio may vary within upper and lower limits that achieve a TDS concentration within 5%, preferably within 2.5% of the target concentration for the main phase of the waterflood. During the period of time over which there is a reduction in salinity of the injection water, excess RO permeate from the RO units of the RO array may be discharged from the blending system, tor example, into a body of water, via an RO permeate "dump line" provided with a "dump valve". The rate at which the low salinity injection water is injected into the injection well may initially be lower than the injection rate for the main phase of the low salinity waterflood such that the injection rate is increased as the TDS concentration of the injected water is close to or reaches the target TDS concentration for the main phase of the waterflood. Accordingly, excess NF permeate from the NF units of the NF array may also be discharged from the desalination plant during commissioning of the injection well, for example, into a body of water, via an NF permeate "dump link." provided with a "dump valve". Once the target TDS concentration and target injection rate are reached for the main phase of the low salinity waterflood, dumping of RO permeate and of NF permeate can be decreased or ended altogether because the output of the RO and NF permeates from the desalination plant can be designed to match the blending ratio of RO permeate to NF permeate and the injection rate for the main phase of the low salinity waterflood.

It is known that divalent cations may be beneficial for stabilizing reservoir rock that has the potential to release fines, and thus, can function as fines stabilizing additive(s). In general, "fines" can include clay particles and silica particles. Optionally, the integrated system may have a by-pass line for the high salinity water used as feed to the RO and NF arrays of the desalination plant as this high salinity water, for example, seawater (SW), typically contains high levels of divalent cations. The by-pass line can be provided with a variable or adjustable valve and can be in fluid communication with one or more of the NF permeate line, the RO permeate line, or a combined RO/NF permeate line, thereby allowing the combined RO/NF permeate stream to be blended with variable amounts of the high salinity water. Accordingly, the divalent cation content of the injection water may be controlled to variable concentrations during commissioning of the injection well.

However, when blending with seawater containing high levels of sulfate anions, the souring or scaling risk for the reservoir can be taken into account. The person skilled in the art will understand that not all reservoirs present a souring risk or a scaling risk. Thus, souring may occur when a reservoir contains an indigenous population of sulfate reducing bacteria (SRB) that obtain energy by oxidizing organic compounds while reducing sulfate to hydrogen sulfide. Scaling may occur when connate water containing high levels of precipitate precursor cations such as barium and strontium cations mixes with an injection water containing relatively high amounts of sulfate anions resulting in the precipitation of insoluble sulfate salts (mineral scales). The souring or scaling risk for a reservoir can be managed for example, by maintaining the sulfate concentration for the blended injection water at or below about 100 ppmv, preferably at or below about 75 ppmv, yet more preferably at or below about 50 ppmv, or most preferably, at or below about 40 ppmv.

It is also envisaged that one or more fines stabilizing additive(s) for stabilizing reservoir rock that has the potential to release fines may be added to the low salinity injection water during commissioning of the low salinity injection well. The fines stabilizing additive(s) may be added to the injection water either in the form of a powder (e.g., from a hopper) or in the form of a concentrate (e.g., from a concentrate tank). Where there is no hopper or storage tank for a concentrate available at the injection site, a concentrated solution of a fines stabilizing inorganic salt may be delivered to the injection site by tanker and may be injected directly from the tanker into the blended injection water. In the case of an offshore reservoir, the tanker is a tanker ship.

The fines stabilizing additive(s) may be an inorganic salt such as a salt of a divalent cation or a potassium salt. Preferably, the salt of the divalent cation is a calcium salt or magnesium salt such as calcium chloride, calcium bromide, calcium nitrate, magnesium chloride, magnesium bromide or magnesium nitrate. Preferably, the salt of the divalent cation is calcium chloride or calcium nitrate. Preferably, the potassium salt is selected from potassium chloride, potassium bromide and potassium nitrate.

The use of calcium nitrate, magnesium nitrate or potassium nitrate as a fines stabilizing additive may be advantageous as a nitrate salt is often added to an injection water during the main phase of a waterflood to provide souring control. Thus, nitrate salts encourage the growth of nitrate reducing bacteria that may out-compete sulfate reducing bacteria for nutrients and assimilable organic carbon. Accordingly, a concentrate tank for a nitrate salt may be available at the injection site. Given that the flow rate of the injection water into the injection well during commissioning of the injection well is generally lower than the flow rate into the injection well during the main phase of the low salinity waterflood, the injection capacity at the injection site for calcium nitrate, magnesium nitrate or potassium nitrate may be sufficient to provide the concentration of calcium ions or potassium ions for the commissioning phase (typically, a higher concentration is required for controlling formation damage during commissioning of an injection well that for controlling souring or scaling during the main phase of the waterflood).

During commissioning of the low salinity water injection well, the composition of the blended RO and NF permeate stream (that is optionally blended with a high salinity water such as SW and/or with a fines stabilizing concentrate stream) may be controlled to a variable TDS content, variable ionic composition (e.g., variable concentrations of individual ions or variable concentrations of types of individual ions that may result in variable ratios of individual ions or variable ratios of types of individual ions), a variable concentration of one or more fines stabilizing additives, or variable pH, each of the foregoing typically to within pre-set limits. Thus, initial values for chemical characteristics of the blended injection water (such as TDS concentration, the concentrations of one or more individual ions, the concentrations of one or more types of individual ions, the concentration of one or more fines stabilizing additives or, optionally, pH) may be inputted into a control unit of the integrated system, and these values may be subsequently adjusted automatically by the control system (either stepwise or gradually) along a planned concentration profile (or optionally along a pH profile) until target values for the chemical characteristics of the blended injection water for the main phase of the low salinity waterflood are reached. Thus, there are initial and final set points for the composition of the blended injection water and a concentration profile (and optionally a pH profile) for moving between the initial and final set points. In general, the planned concentration profile (and optional pH profile) alters the chemical characteristics of the blended injection water over a time period.

Managing the blending ratios of RO and NF permeate by changing the amount of RO permeate that is dumped from the blending system via the RO dump line provides a robust control of the TDS concentration set point for the blended injection water stream that can respond rapidly to any decrease in injectivity encountered during commissioning of the injection well (e.g., as an indication of formation damage). Thus, changing the amount of RO permeate dumped from the blending system offers the potential for a faster response than if an attempt was made to change the flow rates of feed water to the RO and NF arrays of the desalination plant owing to the dead volumes in the lines leading from the RO and NF arrays to the blending point(s) of the blending system.

The blending system for carrying out the blending of the various blending streams can have a number of components and sensors. In some instances, the system can have concentration sensors for measuring one or more of the total concentration of dissolved solids ($C_t$), the concentrations of one or more individual ions ($C_i$), the concentrations of one or more types of individual ions ($C_{i\ type}$) in one or more of the blending streams (the RO permeate stream, NF permeate stream, and optional high salinity water stream (e.g., a SW stream)) and in the blended injection water stream, or combinations thereof. Optionally, the system can have pH sensors for measuring the pH of one or more of these streams. Optionally, the system may also have a sensor for determining the concentration of the fines stabilizing additive(s) in the fines stabilizing concentrate stream. A conductivity sensor may be used to determine TDS concentration, ion concentration sensors (typically, glass sensors having membranes that are permeable to specific ions or specific types of individual ions) may be used to determine the concentrations of individual ions or types of individual ions, and pH sensors may be used to determine the pH, in particular, the blending system may have ion concentration sensors for measuring at least one of the chloride anion concentration, bromide anion concentration, calcium cation concentration, magnesium cation concentration, potassium cation concentration, nitrate anion concentration, and sulfate anion concentration of one or more of the blending streams and of the blended injection water stream.

The system can also include flow rate sensors for measuring the flow rates of one or more of: the RO permeate blending stream, the RO permeate dump stream, the NF permeate blending stream, the NF permeate dump stream, the high salinity water blending stream, the fines stabilizing concentrate stream, and the blended injection water stream.

The control unit includes a CPU (Central Processing Unit), a RAM (Random Access Memory), a ROM (Read Only Memory), a HDD (Hard Disk Drive), I/F (Interfaces), and the like, and is implemented by executing a predetermined control program stored in the ROM by the CPU. The control program can configure the processor (when executed upon the processor) to perform any of the steps and methods described herein.

The concentration sensors, the flow rate sensors, and any other sensors described herein (e.g., pH sensors) may communicate with the control unit of the control system through any suitable communication technology, such as a direct electrical connection, a wireless electrical connection (e.g., Bluetooth) or a fibre optic cable connection (e.g., fibre optic telemetry line).

The composition of the blended injection water can be controlled by adjusting one or more of the opening degree of the valve on the RO permeate dump line, the opening degree of the valve on the optional high salinity water (e.g., SW) by-pass line, the opening degree of the valve on the NF dump valve, or the opening degree of the valve on the optional fines stabilizing concentrate line.

The control unit can determine the flow rates of the RO permeate stream, the NF permeate stream, the optional high salinity water (e.g., SW) stream, the optional fines stabilizing concentrate stream to be supplied to the blending point(s) of the blending system, or combinations thereof to produce a blended injection water having a composition on the planned concentration profile (or on a recovery concentration profile for dealing with an upset condition) based on the ion concentrations $C_t$, $C_i$ or $C_{i\ type}$ and optionally based on the concentration of any fines stabilizing additives). The controller can also adjust the flow rate and composition of the blended injection water in response to any deterioration of injectivity, and hence, in response to potential formation damage. For example, in such a case, the TDS concentration of the blended injection water can be increased along a recovery concentration profile to a value at Which injectivity stabilizes and can be held at this value before a further attempt is made to lower the TDS concentration of the blended injection water.

Thus, the control unit can adjust the flow rates of the various blending streams to the blending point(s) of the blending system, and hence, the blend ratios of the various blending streams to gradually move the composition of the blended injection water to the target composition for the main phase of the waterflood without compromising injectivity (and, if applicable, without risking souring or scaling of the reservoir). The control unit can adjust the amount of RO permeate (or NF permeate) dumped from the blending system (e.g., overboard) via the RO permeate dump line (or via the NF permeate dump line). The control unit can also adjust the flow rate of the high salinity water stream that may be optionally blended with the RO permeate and NF permeate to form the blended injection water via a flow control valve on the high salinity water by-pass line. However, if desired, any excess high salinity water may also be dumped from the blending system (e.g., overboard) via a high salinity water dump line provided with a high salinity water "dump valve". The control unit can also adjust the flow rate of the fines stabilizing concentrate that may be optionally blended with the RO permeate and NF permeate to form the injection water via a flow control valve on the fines stabilizing concentrate line of the blending system. Alternatively, where there is a concentrate tank for the fines stabilizing concentrate that is provided with a metering pump to accurately dose the fines stabilizing concentrate into the blended injection water, the control unit can adjust the amount of fines stabilizing additive dosed into the blended injection water using the metering pump to match the concentration profile for the fines stabilizing additive(s). The metering pump may be linked to a flow rate meter that measures the amount of the fines stabilizing additive(s) added to the blended injection water.

The integrated system additionally comprises an injection system comprising an injection line and one or more injection pumps for injecting the blended injection water into an injection well penetrating an oil-bearing layer of reservoir rock.

The blending of the various streams may be automated and controlled in real time based on the impact of the change in composition (e.g., a change in TDS concentration, change in the concentration of one of more individual ions or types of individual ions, a change in the concentration of a fines stabilizing additive or a change in pH) of the blended injection water stream on injectivity (e.g., as an indication of potential formation damage). A change in injectivity may result in an increase in pressure in the injection well (hereinafter referred to as "downhole pressure"), an increase in pressure at the wellhead of the injection well (hereinafter referred to as "wellhead pressure"), a decrease in flow rate of the blended injection water in the injection line of the injection system measured downstream of the injection pump(s) (hereinafter referred to as "flow rate of the blended injection water"), or combinations thereof. If necessary, the rate of reduction in TDS concentration (salinity) of the blended injection water stream may be reduced, or the TDS concentration (salinity) may be temporarily held constant or may be increased along a concentration recovery profile, if there is evidence of loss of injectivity. Similarly, the rate of change in the ionic composition (rate of change in the concentration of one or more individual ions or types of individual ions) or the rate of change of the pH of the blended injection water may be reduced or the change may be temporarily reversed along a recovery concentration profile (or the ionic composition may be temporarily held constant), if there is evidence of loss of injectivity.

As discussed above, the integrated system comprises a control system. This control system comprises a control unit into which can be inputted:

an initial composition for the injection water defined by initial set point(s) for one or more chemical characteristics of the injection water;

a target composition for the injection water defined by target set point(s) for the one or more chemical characteristics;

a planned concentration profile for the one or more chemical characteristics during commissioning of the injection well;

one or more recovery concentration profiles for the one or more chemical characteristics for an upset condition that occurs during commissioning of the injection well wherein the upset condition is indicative of a loss of injectivity;

optionally, a planned pH profile and a recovery pH profile;

a target flow rate profile for the injection water during commissioning of the injection well; and one or more of a maximum permitted increase in downhole pressure, a maximum permitted increase in wellhead pressure and a maximum permitted decrease in flow rate of the blended injection water in the injection line during commissioning of the injection welt.

The initial set point(s) for the chemical characteristic(s) define a composition for the injection water having a tower risk of causing formation damage in the rock formation surrounding the injection well as compared with the composition defined by the target set point(s).

The chemical characteristics for the blended injection water can be selected from the group consisting of the TDs concentration, ionic strength, the concentrations of one or more individual ions (such as sulfate anions, nitrate anions, calcium cations, magnesium cations or potassium cations), the concentrations of types of individual ions (such as monovalent cations, monovalent anions, multivalent anions, multivalent cations, or divalent cations), ratios of types of individual ions, ratios of individual ions (such as Sodium Adsorption Ratio), the concentration of one or more fines stabilizing additive(s), and, the pH of the blended injection water stream.

The skilled person would understand that an increase in downhole pressure, an increase in the pressure at the wellhead pressure or a decrease in flow rate of the injection water in the injection line arises from a loss of injectivity of the blended injection water and may be indicative of formation damage such that setting a limit on the increase in pressure (i.e. a threshold value for the pressure above which there is unacceptable decrease in injectivity) or a limit on the decrease in flow rate (i.e., a threshold value for the flow rate below Which there is an unacceptable decrease in injectivity) maintains the injection well in a safe condition that limits the level of formation damage.

The planned concentration profile may include one or more of: a gradual decrease in the TDS concentration; a gradual decrease in the concentration of one or more individual ions; a gradual decrease in the concentration of one or more types of individual ions; a gradual decrease in pH; a gradual change in the ratio(s) of individual ions; or, a gradual change in the ratio(s) of types of individual ions and, a gradual decrease in pH. Alternatively, the concentration profile may have stepped reductions in one or more of the TDS concentration, the concentration of one or more individual ions, the concentration of one or more types of individual ions, and in pH; or stepped changes in the ratios of individual ions or in the ratios of types of individual ions. Each stepped reduction or stepped change is followed by a period of time with no alteration to the composition of the injection water to determine if there is a decrease in injectivity arising from formation damage.

The downhole pressure or the pressure at the wellhead can be measured in real time using a measurement device such as a pressure sensor that is linked to the control unit via any suitable communication technology to provide feedback control. In the event of any increase in downhole pressure or any increase in wellhead pressure to a value approaching the maximum permitted inputted value, the control unit changes the concentration profile (e.g., by holding the blending ratio of the RO permeate and NF permeate stream constant) until the pressure stabilizes or begins to fall in the injection well or at the wellhead. Alternatively, the flow rate of the injection water in the injection line may be monitored in real time using a measurement device such as a flow rate sensor that is linked to the control unit via any suitable technology to provide feedback control. In the event of any decrease in flow rate to a value approaching the inputted maximum permitted value, the control unit changes the concentration profile (e.g., by holding the blending ratio of the RO permeate and NF permeate streams constant) until the flow rate stabilizes or begins to increase in the injection line.

However, if the pressure or the flow rate does not stabilize, the control unit may alter the composition of the injection water by either moving back along the planned concentration profile towards the initial set point(s) for the chemical characteristic(s) or may follow a recovery concentration profile for an "upset" condition or state. This recovery concentration profile can be inputted into the control unit and follows a plan for increasing one or more of the TDS concentration, the concentrations of the one or more individual ions, the concentrations of one or more types of individual ions, or the concentration(s) of fines stabilizing additive(s) in the event that the downhole or wellhead pressure does not stabilize (or the flow rate in the injection line does not stabilize). Thus, the control system may alter the composition of the injection water along the planned concentration profile or recovery concentration profile by one or more of increasing the amount of RO permeate dumped from the blending system, increasing the amount of the optional high salinity water blending stream in the blended injection water or the amount of the optional fines stabilizing concentrate stream in the blended injection water.

In some instances, the initial set point for the TDS concentration of the injection water during commissioning of the injection well may be in the range of 10,000 mg/L to 22,500 mg/L, preferably, 15,000 mg/L to 17,500 mg/L. The target set point for the TDS concentration of the injection water for the main phase of the low salinity waterflood is typically in the range of 500 to 5,000 ppm, preferably, 500 to 3,000, in particular 1,000 to 2,000 ppm. The TDS concentration is preferably reduced during commissioning of the injection well over a period of time of up to one week, for example, two to five days.

When individual ion concentrations are taken into account, the calcium ion concentration of the injection water may be decreased from an initial set point of about 400 mg/L to a target set point in the range of 5 to 25 mg/L. Further, the sulfate ion concentration may be decreased from an initial set point of about 2000 mg/L to a target set point of less than 40 mg/L.

There may be a gradual reduction in salinity or there may be stepped changes in salinity.

Where there is a gradual decrease in TDS concentration of the injection water, the concentration profile typically follows an asymptotic curve decreasing from the initial TDS concentration to the target TDS concentration for the main phase of the waterflood with the rate of decrease reducing as the TDS concentration approaches concentrations at which formation damage would occur if the formation rock was to be subjected to "salinity shock" during commissioning of the injection well (e.g., by commissioning the well with either a rapid change in salinity of the injection water or by commencing water injection with an injection water having the target TDS concentration). Typically, the rate of reduction may decline as the TDs concentration falls below 10,000 ppmv The initial rate of decrease of TDS concentration may therefore be in the range of 100 to 1000 mg/L per hour. Once the salinity falls to below 10,000 mg/L, the rate of decrease of TDS concentration may fall to 50 to 500 mg/L per hour. Once the salinity falls to below 7,000 mg/L, the rate of decrease may fall to 25 to 200 mg/L per day. However, the person skilled in the art will understand that for each stage, the salinity is lower than the previous salinity.

In the case of stepped changes in salinity, the initial salinity may be a value in the range of 15,000 to 22,000 mg/L and the salinity may then be reduced by increments selected from within the range of 1000 to 5000 mg/L until the TDS concentration is about 10,000 mg/L. The increments by which the salinity is reduced may then be reduced to a value in the range of 250 to 500 mg/L. Once the salinity falls to below 7,000 mg/L, the increments may be further reduced, for example, to 100 to 250 mg/L. The salinity can the typically be held at each value for a period of time from 1 to 10 hours, preferably, 1 to 5 hours. If an upset condition arises, the TDS concentration may be increased, for example, to the preceding value or to an intermediate value, and the downhole pressure or wellhead pressure can be monitored to determine if the pressures stabilizes or the flow rate in the injection line can be monitored to determine if the flow rate stabilizes.

As discussed above, the planned concentration profile for the one of more chemical characteristics of the injection water may also comprise decreasing the concentrations for one or more individual ions or of one or more types of individual ions, changing the ratios of individual ions or of types of individual ions, changing the concentration(s) of one or more fines stabilizing additives, or combinations thereof. The control unit may determine the flow rates of NF permeate, RO permeate, and optionally, high salinity water, fines stabilizing concentrate, or combinations thereof to the blending point(s) of the blending system and optionally, the flow rates of NF permeate, and RO permeate in the dump lines, based on the initial set values, target set values and the planned concentration profile for one or more of these additional chemical characteristics so that the concentrations of one or more individual ions, the concentrations of one or more types of individual ions, the ratios of individual ions, the ratios of types of individual ions, or the concentration of fines stabilizing additive(s) in the injection water correspond to the planned concentration profile.

Where there is a risk or souring or scaling of the reservoir, the control unit also controls the sulfate anion concentration of the injection water from an initial value (e.g., less than 200 mg/L) to a target value for the main phase of the waterflood of less than 40 mg/L.

In the integrated system, because of the need to rapidly adjust the TDS concentration of the blended injection water during commissioning of the injection well, the total ion concentration Ct (and optionally, the concentrations of individual ions) and the flow rate Qt of the injection water (and the flow rates Qi of the individual blending streams and of the RO and NF dump streams) can be constantly monitored (in real time) together with the pressure in the injection well adjacent the oil-bearing reservoir or the pressure at the wellhead as measured by a pressure sensor (or the flow rate of injection water in the flow line of the injection system downstream of the injection pump as measured by a flow rate sensor). The planned concentration profile for the blended injection water can be adjusted based on the pressure in the injection well or at the wellhead (or based on the flow rate in the injection line downstream of the injection pump(s)) with the aim of controlling the increase in the pressure (or decrease in flow rate), and hence, loss of injectivity arising from formation damage within an acceptable level. Therefore, by controlling the pressure in the injection well or at the wellhead (or the flow rate in the injection line) by adjusting the composition of the blended injection water in real time along a planned concentration profile or a recovery concentration profile, it is possible to avoid entering a regime where there is a risk of formation damage occurring or to reduce the amount of formation damage that occurs during commissioning of the injection well to within acceptable levels. Specifically, the TDS concentration (salinity) of the blended injection water may be controlled in response to an increase in injection welt pressure or wellhead pressure (or in response to a decrease in flow rate in the injection line) in real time by either holding the TDS concentration at the concentration reached along the planned concentration profile or increasing the TDS concentration to a higher value by moving back along the planned concentration profile or along a recovery concentration profile until the pressure stabilizes or begins to fall in the wellbore. The use of the RO and NF dump lines provided with adjustable valves allows for rapid adjustments (in real time) to the set points for the TDS concentration and composition of individual ions in the injection water stream.

Thus, the pressure in the injection well or at the wellhead can be measured with a measurement device such as a pressure sensor that is linked to the control unit via any suitable communication technology to provide feedback control in the event that injectivity of the injection water into the rock formation surrounding the injection well begins to decline owing to formation damage. A reduction in injectivity may also result in a reduced flow rate of injection water downstream of the injection pump(s) for the injection system of the injection well. Accordingly, a flow rate sensor may be located downstream of the injection pump(s) and the control unit may receive flow rate data with a maximum permitted decrease in flow rate inputted into the control unit. The control unit may also measure the TDS concentration with an ion concentration sensor and can adjust the TDS concentration of the injection water stream to a lower value along a planned concentration profile by decreasing the amount of RO permeate dumped via the dump line and holding the TDS concentration at the lower value for a predetermined period of time to determine if the pressure in the wellbore increases to close to the maximum permitted increase or the flow rate of the injection water decreases to close to the maximum permitted decrease. If so, the control unit may make a determination to continue to hold the TDS concentration at the lower value by increasing the predetermined period of time. Alternatively, the control unit may make a determination to increase the TDS concentration of the injection water to a higher value along a recovery concentration profile by increasing the amount of RO permeate dumped via the RO dump line and to hold the TDS concentration at the higher level while monitoring the downhole pressure or the pressure at the wellhead to determine if it stabilizes or begins to decline back to its original value. The control unit can then make a further attempt to reduce the salinity of the injection water stream along the planned concentration profile. Optionally, the control unit may make a determination to reduce the flow rate of the injection water stream or to stop injecting the injection water stream into the injection well if the pressure continues to rise. The control unit may then make a determination to inject a fines stabilizing concentrate into the near wellbore region of the injection well before recommencing commissioning of the injection well.

Once the pressure in the injection well has stabilized, the control unit can select a new lower set point for the TDS concentration of the blended injection water and adopt a TDS concentration reduction profile to reach the new lower set point while again monitoring the pressure in the wellbore or at the wellhead. The concentration reduction profile determines the extent to which the RO permeate dump valve is open (e.g., the opening degree). This is based on a correlation between the TDS concentration (or the ionic composition) of blended injection water stream and the blending ratio for the NF permeate and RO permeate and on the amount of any optional high salinity water and fines stabilizing concentrate included in the blended water stream. The correlation is based on the assumption that the compositions for the NF permeate, RO permeate, optional high salinity water, and optional fines stabilizing concentrate remain within predetermined tolerances. The blending ratio of the RO and NF permeate together with the flow rate of the injection water stream determines the flow rate of the RO permeate (and of any NF permeate) for disposal via the RO dump line (and the NF dump line) and the flow rate of RO permeate and of NF permeate to be supplied to the blending point for the NF permeate and RO permeate to form the blended injection water stream. A correlation can be stored in advance in the control unit (e.g., the control unit memory), between the opening degrees of the RO dump valve (and NF dump valve) and hence the flow rates of RO permeate and NF permeate to the blending point for the blended injection water and the composition of the injection water stream (TDS concentration and the concentrations of individual ions or types of individual ions). There may also be included a correlation between the opening degree of the valve on the optional high salinity water (e.g. SW) by-pass line and the opening degree of the valve on the fines stabilizing concentrate line (or the adjustment of a metering pump on the fines stabilizing concentrate line) on the composition of the injection water stream. Then, the control unit controls the opening degree of the RO dump valve so as to be at the predetermined opening degree for achieving a composition for the blended injection water on the planned concentration profile (or on a recovery concentration profile). As a result, the correct flow rates of RO permeate and NF permeate are supplied to the blending point(s) of the blending system to form a blended injection water with a composition that matches the concentration profile.

If there is a loss of injectivity in the injection well as evidenced by a rise in pressure in the injection well, the TDS concentration (salinity) of the blended injection water may be increased, along a recovery concentration profile designed to recover injectivity, by increasing the opening of the RO dump valve until the downhole or wellhead pressure stabilizes and begins to decline (or the flow rate of the injection water stabilizes and begins to rise). By continuously monitoring the downhole or wellhead pressure (or the flow rate of the injection water) in real time it is possible to prevent the pressure from increasing significantly (or the flow rate from decreasing significantly), and hence, prevent significant loss of injectivity. Therefore, it is possible to gradually reduce or make stepped changes in the TDS concentration (salinity) (or in the concentrations of individual ions or types of individual ions) the water injected into the injection well during the commissioning of the injection well by using a salinity reduction profile (or concentration reduction profile for individual ions or types of individual ions) that is set in advance and is predicted to mitigate the risk of formation damage. It is also possible to make real time adjustments to the salinity and composition of the injection water if there is evidence unacceptable loss of injectivity, thereby allowing a low salinity injection well to be reliably brought into commission in a stable condition for injection of a low salinity water with the target salinity (or ionic composition) for the main phase of the low salinity waterflood.

It may be preferred that the flow rate of the NF permeate to the blending point for forming the blended injection water is kept constant during commissioning of the low salinity injection well and is only ramped up to achieve the flow rate for the main phase of the low salinity waterflood once the target salinity for the main phase of the injection well has been achieved. Thus, a portion of the NF permeate may be continuously dumped via the NF permeate dump line during commissioning of the injection well. It may also be advantageous to temporarily decrease the flow rate of the injection water stream during commissioning of the low salinity injection well if a significant increase in downhole pressure or pressure at the wellhead is detected indicative of a significant loss of injectivity (i.e., an increase in pressure that is at least 5% above, for example, at least 10% above the inputted maximum permitted increase in pressure)

It is to be understood that the planned concentration profile and recovery concentration profile tor altering the salinity (TDS concentration), the ionic strength, the concentrations of individual ions, the concentrations of types of individual ions and the concentration(s) of the optional fines stabilizing additive(s) vary depending on the composition of the formation rock of the hydrocarbon-bearing layers of the oil reservoir, and in particular, on the levels of swellable and migratable fines (e.g., clay and silica particles) that are known to be linked to formation damage.

The planned concentration profiles and the recovery concentration profiles used with any of the systems or methods described herein may be determined by analysing a sample of rock taken from the oil-bearing layer of the reservoir in the vicinity of the injection well. Analysis of the rock may include, but is not limited to, identifying the presence and quantity and types of fines. In some embodiments, analysis of the formation rock may comprise determining a clay composition in the range from about 2 weight % to about 20 weight %. Analytical methods for quantifying clays may include geophysical logs, thin section point counting, X-ray diffraction analysis, and sieve analysis. The planned concentration profile may be determined from correlations of formation damage occurring with different concentration profiles for injection waters for a range of rock samples with different clay contents and clay compositions. An optimal concentration profile may be selected for a rock sample that most closely matches the composition of the reservoir rock surrounding the injection well (i.e., using historical data). Alternatively, experiments may be performed on samples of the rock taken from the oil-bearing layer of the reservoir in the vicinity of the injection well using different salinity profiles for the injection water to determine an optimal concentration profile for commissioning of the injection well.

Systems and methods in accordance with the principles described herein will now be illustrated by reference to FIG. 1.

FIG. 1 shows an integrated system for producing a blended injection water of variable composition for use as an injection water during commissioning of a low salinity water injection well. In this embodiment, the integrated system comprises: a desalination plant; a blending system comprising various flow lines for various blending streams for forming the blended injection water of variable composition; an injection system comprising an injection line 17 and one or more pumps 18 for injecting the injection water into a low salinity water injection well 20 penetrating an oil bearing layer 22 of a reservoir; and, a control system comprising a control unit 50 for controlling the operation of the integrated system.

The desalination plant comprises a membrane block 1 for treating a high salinity feed water (typically seawater). The membrane block 1 has a main feed line 2, a feed pump 3, an RO array 4, and an NF array 5 (each array 4, 5 may be a single or multistage array). Both the RO array 4 and the NF array 5 may have the same high salinity feed water (for example, SW) as shown in FIG. 1. In this case, the main feed line divides to form a feed line 14 for the RO array 4 and a feed line 12 for the NF array 5. However, it is also envisaged that RO concentrate (also referred to in the art as "retentate") from a first RO stage may divide to form a feed stream for a second RO stage and a feed stream for the NF array.

The RO array 4 comprises a plurality of RO units. The NF array 5 comprises a plurality of NF units. Typically, the number of units of the RO array 4 and of the NF array 5 are chosen to match the required production capacity of RO permeate and NF permeate for the injection water during the main phase of the low salinity waterflood. The desalination plant may also be provided with a by-pass line 6 for the high salinity feed water (e.g., SW).

The integrated system has valves V1 to V5 and various flow lines (conduits) configured to provide the flow paths described below. Valves V1 to V5 may be throttle valves that may be set to various positions between fully open and fully closed positions. The flows and pressures through the membrane block 1 may be controlled by the feed pump 3, valves V1 to V5, or any combination thereof. Flow rate sensors Q1 to Q9 are provided for determining the flow rates in the various flow lines and communicate flow rate data to the control unit via electrical signal lines (the dotted lines in FIG. 1). However, the flow rate sensors Q1 and Q2 on the INF concentrate line 7 and RO concentrate lines 8 may be omitted. Ion concentration sensors S1 to S7 are also provided to determine one or more of the total concentration of dissolved ions (i.e., the TDS concentration), the concentration of one or more individual ions or the concentration of one or more types of individual ions in the various flow lines, or combinations thereof. Ion concentration data can also be communicated to the control unit 50 via control lines as described herein. The sensors S4 and S6 on the NF concentrate line 7 and RO concentrate line 8, respectively, may be omitted.

In the embodiment shown in FIG. 1, the feed pump 3 passes high salinity feed water to the RO array 4 via lines 2 and 14 where the high salinity feed water is separated into an RO permeate and an RO concentrate, and to the NF array via lines 2 and 12 where the high salinity feed water is separated into an NF permeate and NF concentrate. The pressures of the high salinity feed water to the RO array 4 and to the NF array 5 may be adjusted (for example using a booster pump for the RO feed or a pressure let down valve for the NF feed) to match the operating pressure of the RO units of the RO array 4 and the NF units of the NF array 5 (NF units are typically operated at a lower pressure than RO units). Optionally, the feed pump 3 may pump a portion of the high salinity feed water through the by-pass line 6.

Valves V1 and V2 on RO and NF concentrate bleed lines 8 and 7, respectively, are at least partially open to provide a bleed of RC) concentrate and NF concentrate from the blending system. The NF permeate flowing through line 13 is then combined with the RO permeate flowing through line 9 to form a combined RO/NF permeate that flows through line 15.

The blend ratio of NF permeate to RO permeate may be adjusted by varying the degree of opening of the throttle valves on the RO permeate dump line 11 and/or NF permeate dump line 10 to alter the composition of the combined RO/NF permeate. Optionally, variable amounts of high salinity water (e.g., SW) may be injected from the high salinity water by-pass line 6 into the combined RO/NF permeate flowing through line 15 to adjust the composition of the blended injection water. Optionally, a fines stabilizing concentrate is stored in concentrate tank 30. Typically, the concentrate tank 30 is provided with a metering pump 25 such that variable amounts of a fines stabilizing concentrate may be injected from line 16 into the RO/NF permeate flowing through line 15 to adjust the composition of the blended injection water.

The resulting blended injection water is then pumped into the injection well 20 via injection line 17 and one or more injection pumps 18.

As discussed above, a planned concentration profile for altering the composition of the blended injection water during commissioning of the injection well is inputted into the control unit 50. Altering the composition is automated in real time along either a planned concentration profile (inputted into the control unit) for reaching the target composition for the low salinity water for the main phase of the low salinity waterflood or, in the event of an upset condition or event, along a recovery concentration profile (inputted into the control unit) for dealing with the upset condition or event. The upset condition or event may be a reduction in injectivity as evidenced by a decrease in flow rate at sensor Q9 or an increase in pressure in the injection well 20 adjacent the hydrocarbon bearing layer of the reservoir as evidenced by sensor 23 (or an increase in pressure at the wellhead). Typically, a minimum value for the flow rate or a maximum value for the pressure in the injection well (or at the wellhead) are inputted into the control unit 50 with an upset condition or event occurring if the flow rate decreases to a value at or near the inputted minimum flow rate or if the pressure increases to a value at or near the inputted maximum pressure.

The control unit 50 sends instructions to alter the blend ratio of RO permeate and NF permeate by changing the opening degree of the throttle valves V4 and/or V3 (and optionally, instructions to alter the amount of high salinity water or fines stabilizing concentrate dosed into the combined RO/NF permeate by changing the opening degree of the throttle valve on the high salinity bypass line 6 or by changing the operation of metering pump 25) to provide either a composition on the planned concentration profile for achieving the target composition for the main phase of the low salinity waterflood or, if an upset condition or event occurs, to provide a composition on the recovery concentration profile for the upset event.

The control unit 50 may therefore monitor the pressure sensor 23 for an increase in downhole pressure (or may monitor a pressure sensor located in the wellhead for an increase in pressure at the wellhead) and/or may monitor the flow sensor Q9 located in the injection line 17 for a decrease in flow rate of the injection water (where an increase in pressure or a decrease in flow rate are indicative of a decrease in injectivity arising from formation damage). If the increase in pressure or decrease in flow rate remains within acceptable limits, the control unit will continue to adjust the composition of the blended injection water along the planned concentration profile. However, if the increase in pressure reaches the inputted maximum pressure and/or the flow rate in the flow line reaches the inputted minimum the flow rate, the control unit 50 then alters the composition of the injection water along the concentration profile for the upset condition or event by one or more of:

increasing the TDS concentration of the injection water by increasing the blend ratio of NF permeate to RO permeate, increasing the divalent cation content of the injection water (in particular calcium cation content) by adding an increased amount of SW into the combined RO/NF permeate stream; or adding an increased amount of fines stabilizing concentrate to the combined RO/NF permeate stream.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. An integrated system comprising:
    a desalination plant comprised of a reverse osmosis (RO) array to produce an RO permeate blending stream and a nanofiltration (NF) array to produce an NF permeate blending stream;
    a blending system;
    a control unit; and
    an injection system for an injection well that penetrates an oil-bearing layer of a reservoir, the injection system comprising an injection line and at least one injection pump;
    wherein the blending system is configured to blend the RO permeate blending stream and the NF permeate blending stream to produce a blended injection water stream and to pass the blended injection water stream to the injection system,
    wherein the control unit is configured to dynamically alter operation of the blending system to adjust amounts of at least one of the RO permeate blending stream and the NF permeate blending stream to alter the composition of the blended injection water stream from an initial composition to a target composition, and wherein the control unit is configured to dynamically alter operation of the blending system to adjust the amounts of the at least one of the RO permeate blending stream and the NF permeate blending stream by adjusting an amount of at least one of the RO permeate and NF permeate discharged from the blending system via an RO permeate dump line or an NF permeate dump line, respectively.

2. The integrated system of claim 1 wherein the blending system is further configured to blend the RO permeate blending stream and the NF permeate blending stream with a high salinity water blending stream having a salinity of from 17,500 to 50,000 mg/L to produce the blended injection water stream, and
wherein the control unit is configured to dynamically alter operation of the blending system to adjust the amounts of the at least one of the RO permeate blending stream and the NF permeate blending stream and an amount of the high salinity water blending stream to alter the composition of the blended injection water stream from the initial composition to the target composition.

3. The integrated system of claim 1, wherein the control unit is to dynamically alter operation of the blending system to alter the composition of the blended injection water stream from the initial composition to the target composition by following a concentration profile for decreasing the salinity or ionic strength of the blended injection water stream.

4. The integrated system of claim 3, wherein the control unit is configured to receive the concentration profile from a source external to the control unit.

5. The integrated system of claim 1, wherein the control unit is configured to monitor a pressure in the injection well or at a wellhead of the injection well, in real time, for an increase in pressure to a value at or above a threshold value; and,
when the control unit detects an increase in pressure to a value at or above the threshold value, the control unit either ceases to dynamically alter the composition of the blended injection water stream or dynamically alters the composition of the blended injection water stream by following a recovery concentration profile for increasing the salinity or ionic strength of the blended injection water stream, until the pressure falls to below the threshold value.

6. The integrated system of claim 1, wherein the control unit is configured to monitor a flow rate of the blended injection water stream in the injection line of the injection system downstream of the at least one injection pump, in real time, for a decrease in flow rate to at or below a threshold value; and,
if the control unit detects a decrease in flow rate to a value at or below the threshold value, the control unit either ceases to dynamically alter the composition of the blended injection water stream or dynamically alters the composition of the blended injection water stream by following a recovery concentration profile for increasing the salinity or ionic strength of the blended injection water stream, until the flow rate increases to above the threshold value.

7. The integrated system of claim 5, wherein the control unit is configured to receive the recovery concentration profile from a source external to the control unit.

8. The integrated system of claim 1, wherein the blending system is further configured to blend the RO permeate blending stream and the NF permeate blending stream with a fines stabilizing blending stream to produce the blended injection water stream wherein the fine stabilizing blending stream comprises an aqueous solution of at least one fines stabilizing additive, and
wherein the control unit is configured to dynamically alter operation of the blending system to adjust the amount of fines stabilizing blending stream to alter the composition of the blended injection water stream from the initial composition to the target composition.

9. The integrated system of claim 8 wherein the control unit is configured to dynamically alter operation of the blending system to adjust the amount of fines stabilizing blending stream to alter the composition of the blended injection water stream by following a concentration profile or recovery concentration profile that includes changes to the concentration of the fines stabilizing additive in the blended injection water stream.

10. A method for operating an integrated system comprising:
a desalination plant comprised of a reverse osmosis (RO) array and a nanofiltration (NF) array;
a blending system;
a control unit;
an injection system for an injection well that penetrates an oil-bearing layer of a reservoir;
the method comprising:
introducing a high salinity water feed to the desalination plant;
producing an RO permeate blending stream using the RO array of the desalination plant;
producing an NF permeate blending stream using the NF array of the desalination plant;
blending the RO permeate blending stream and the NF permeate blending stream in the blending system; and
dynamically altering operation of the blending system during commissioning of the injection well to adjust amounts of at least one of the RO permeate blending stream and the NF permeate blending stream to alter the composition of the blended injection water stream from an initial composition to a target composition for a main phase of a low salinity waterflood by following a concentration profile for decreasing the salinity or ionic strength of the blended injection water stream, wherein dynamically altering the operation of the blending system during the commissioning of the injection well to adjust the amounts of the at least one of the RO permeate blending stream and the NF permeate blending stream to alter the composition of the blended injection water stream from the initial composition to the target composition for the main phase of the low salinity waterflood by following the concentration profile for decreasing the salinity or ionic strength of the blended injection water stream includes adjusting an amount of at least one of the RO Permeate and NF permeate discharged from the blending system via an RO permeate dump line or an NF permeate dump line, respectively.

11. The method of claim 10, wherein the desalination plant has a high salinity water by-pass line configured to pass a portion of the high salinity water feed stream as a high salinity blending stream to the blending system wherein the high salinity water feed stream has a total dissolved solids content in the range of 17,500 mg/L to 50,000 mg/L and wherein dynamically altering operation of the blending system during commissioning of the injection well further comprises adjusting an amount of the high salinity water blending stream to alter the composition of the blended injection water stream.

12. The method of claim 10, wherein dynamically altering operation of the blending system during commissioning of the injection well further comprises adjusting the amount of at least one fines stabilizing additive in the blended injection water stream by following a concentration profile that includes changes in the concentration of the fines stabilizing additive.

13. The method of claim 12 wherein the blending system further comprises a vessel for storing a fines stabilizing concentrate comprising an aqueous solution of at least one fines stabilizing additive coupled to a line configured to deliver a fines stabilizing concentrate blending stream, and wherein dynamically altering operation of the blending system during commissioning of the injection well further comprises adjusting an amount of the fines stabilizing concentrate blending stream to alter the composition of the blended injection water stream.

14. The method of claim 10, wherein dynamically adjusting the operation of the blending system comprises adjusting an adjustable valve in the blending system.

15. The method of claim 14, wherein the valve that is adjusted is selected from a valve on the RO permeate dump line, a valve on the NF permeate dump line, a valve on the high salinity water by-pass line, a valve on a high salinity water dump line, a valve on the fines stabilizing concentrate line or any combination thereof.

16. An integrated system comprising a desalination plant, a blending system and a control unit wherein:
   the desalination plant comprises
      a water inlet line;
      a reverse osmosis array in fluid communication with the water inlet line, wherein the reverse osmosis array is configured to receive a feed water and produce a reverse osmosis permeate;
      a nanofiltration array in fluid communication with the water inlet line, wherein the nanofiltration array is configured to receive a feed water and produce a nanofiltration permeate, wherein the nanofiltration permeate has a salinity that is higher than a salinity of the reverse osmosis permeate; and
   the blending system comprises:
      a flow line for a reverse osmosis permeate blending water stream,
      a flow line for a nanofiltration permeate blending stream,
      a flow line for a blended injection water stream,
      at least one of a reverse osmosis permeate dump line configured to pass an unused portion of the reverse osmosis permeate out of the blending system and a nanofiltration permeate dump line configured to pass an unused portion of the nanofiltration permeate out of the blending system, and
      one or more adjustable valves; and wherein
      the control unit is configured to adjust, in response to measured flow rate data, pressure data or composition data, the one or more adjustable valves of the blending system, to selectively combine at least a portion of the reverse osmosis permeate with at least a portion of the nanofiltration permeate to produce a blended injection water stream having a predetermined composition.

17. The integrated system of claim 16 wherein the control unit is configured to adjust an adjustable valve on the RO dump line or on the NF dump line.

18. The integrated system of claim 16, wherein the desalination plant further comprises:
   a by-pass line coupled to the water inlet line configured to pass at least a portion of the feed water to the blending system wherein the control unit is further configured to adjust a valve on the by-pass line to selectively combine a portion of the feed water from the by-pass line with at least the portion of the reverse osmosis permeate and at least the portion of the nanofiltration permeate to produce the blended injection water stream having the predetermined composition.

19. The integrated system of claim 16, wherein the desalination plant further comprises:
   a by-pass line coupled to the water inlet line configured to pass at least a portion of the feed water to the blending system as a feed water blending stream, and wherein the by-pass line is further coupled to a feed water dump line and the control unit is further configured to adjust a valve on the feed water dump line to selectively combine a portion of the feed water from the by-pass line with at least the portion of the reverse osmosis permeate and at least the portion of the nanofiltration permeate to produce the blended injection water stream having the predetermined composition.

20. The integrated system of claim 16, wherein the blending system further comprising a vessel for storing a fines stabilizing concentrate comprising an aqueous solution of at least one fines stabilizing additive coupled to a flow line for a fines stabilizing concentrate blending stream, wherein the control unit is further configured to adjust a valve on the fines stabilizing concentrate flow line to selectively combine the fines stabilizing concentrate with at least one of the reverse osmosis permeate, the nanofiltration permeate, the feed water blending stream, or any combination thereof to produce a blended injection water stream having the predetermined composition.

21. The integrated system of claim 16, wherein the flow rate data, pressure data or composition data pertain to the blended injection water stream.

22. The integrated system of claim 16, wherein the integrated system further comprise a plurality of ion concentration sensors configured to measure at least one of salinity, concentrations of individual ions (Ci) or concentrations of types of individual ions in the nanofiltration permeate, the reverse osmosis permeate or the blended injection water stream and to transmit the measured composition data to the control unit.

23. The integrated system of claim 16, further comprising one or more flow rate sensors, wherein the flow rate sensors are configured to measure at least one of: a flow rate of the reverse osmosis permeate, a flow rate of the nanofiltration permeate, a flow rate of the blended injection water stream, a flow rate of a feed water bypass stream, or a flow rate of a fines stabilizing concentrate stream and to same to the control unit.

24. The integrated system of claim 16, wherein the control unit is configured to adjust, in response to the measured flow rate, pressure and composition data, the one or more valves of the blending system to adjust a composition of the blended injection water stream from an initial composition to a target composition along a concentration profile.

25. A method of producing a blended injection water stream, the method comprising:
producing a reverse osmosis permeate stream;
producing a nanofiltration permeate stream;
blending at least a portion of the reverse osmosis permeate stream with at least a portion of the nanofiltration permeate stream to provide a blended injection water stream having a first salinity;
increasing a blending ratio of the reverse osmosis permeate stream to the nanofiltration permeate stream to decrease the salinity of the blended injection water stream from the first salinity to a second salinity;
dumping a decreasing portion of the reverse osmosis permeate stream while the blending ratio is being increased; and
maintaining the blending ratio when the second salinity is reached, wherein the blended injection water stream is injected into an injection well that penetrates an oil-bearing layer of a reservoir.

26. The method of claim 25, wherein, at the first salinity, the injection water stream has a total dissolved solids (TDS) content in the range of from 10,000 mg/L to 22,500 mg/L and, at the second salinity, the blended injection water stream has a total dissolved solids content in the range of from 500 to 5,000 mg/L.

27. The method of claim 25, further comprising:
increasing a flow rate of the blended injection water stream from a first flow rate to a second flow rate while increasing the blending ratio of the reverse osmosis permeate stream to the nanofiltration permeate stream by dumping the decreasing portion of the reverse osmosis permeate stream and a decreasing portion of the nanofiltration permeate stream as the blending ratio is increased; and
maintaining the flow rate and the blending ratio when the flow rate of the blended injection water stream reaches the second flow rate and the salinity of the injection stream reaches the second salinity.

28. The method of claim 25, wherein the reverse osmosis permeate stream and the nanofiltration permeate stream are produced from a feed water having a TDS in the range of 17,500 to 50,000 mg/L and a divalent cation concentration in the range of 500 to 3500 mg/L, wherein the method further comprises:
blending at least a portion of the feed water with at least the portion of the reverse osmosis permeate stream and with at least the portion of the nanofiltration permeate stream to provide the blended injection water stream; and
decreasing a divalent cation concentration of the blended injection water stream from a first divalent cation concentration to a second divalent cation concentration by blending a decreasing portion of the feed water with at least the portion of the reverse osmosis permeate stream and with at least the portion of the nanofiltration permeate stream.

29. The method of claim 28, further comprising:
detecting a sulfate anion concentration in the blended injection water stream; and
adjusting an amount of the feed water being blended with the reverse osmosis permeate stream and with the nanofiltration permeate stream to maintain the sulfate anion concentration in the blended injection water stream below a sulfate concentration threshold.

30. The method of claim 28, further comprising:
blending at least a portion of a fines stabilizing concentrate stream comprising at least one fines stabilizing additive with at least one of the portion of the reverse osmosis permeate stream, the portion of the nanofiltration permeate stream, the portion of the feed water or any combination thereof to provide the blended injection water stream; and
increasing a fines stabilizing additive concentration of the blended injection water stream in response to a decreasing injectivity of the blended injection water stream into the oil-bearing layer of the reservoir.

31. A method of controlling a composition of a blended injection water stream, the method comprising:
receiving, by a control system, one or more composition parameters for the blended injection water stream;
automatically adjusting, by the control system, one or more valves within a blending system;
blending a reverse osmosis permeate with a nanofiltration permeate in the blending system to produce the blended injection water stream in response to the automatically adjusting of the one or more valves;
controlling, by the control system, the one or more composition parameters for the blended injection water stream to meet corresponding one or more injection water composition parameter targets by:
automatically adjusting the one or more valves to vary a flow rate of the blended injection water stream, and, to vary a blend ratio of the reverse osmosis permeate to the nanofiltration permeate to produce the blended injection fluid having the one or more composition parameters meeting the one or more injection water composition parameter targets, wherein automatically adjusting the one or more valves to vary the flow rate of the blended injection water stream, and, to vary the blend ratio of the reverse osmosis permeate to the nanofiltration permeate to produce the blended injection fluid having the one or more composition parameters meeting the one or more injection fluid composition parameter targets includes adjusting an amount of at least one of the RO permeate and the NF permeate discharged from the blending system.

32. The method of claim 31, wherein the one or more composition parameters comprise a total dissolved solids content of the blended injection water stream, and wherein controlling the one or more composition parameters comprises controlling the total dissolved solids content of the blended injection water stream to match a planned total dissolved solids concentration profile, wherein the planned total dissolved solids concentration profile defines the one or more injection water composition parameter targets over a defined time period.

33. The method of claim 31, further comprising:
blending at least a portion of a feed water with the reverse osmosis permeate and the nanofiltration permeate to produce the injection fluid in response to automatically adjusting the one or more valves in the blending system.

34. The method of claim 32, further comprising:
injecting the injection fluid into a wellbore via an injection line, wherein controlling the one or more composition parameters is based on pressure in the wellbore, pressure at the wellhead or flow rate in the injection line.

* * * * *